(12) United States Patent
DuBose et al.

(10) Patent No.: US 11,697,407 B2
(45) Date of Patent: Jul. 11, 2023

(54) UTILIZING AN AIR FLOW ASSEMBLY WITH INTERMITTENT THRUSTER CAPABILITIES

(71) Applicant: Textron Systems Corporation, Hunt Valley, MD (US)

(72) Inventors: William Keith DuBose, Pensacola, FL (US); Richard Kent deValcourt, Covington, LA (US); Robert Austin Stringer, Slidell, LA (US); Robert Moore, Lacombe, LA (US)

(73) Assignee: Textron Systems Corporation, Hunt Valley, MD (US)

( * ) Notice: Subject to any disclaimer, the term of this patent is extended or adjusted under 35 U.S.C. 154(b) by 0 days.

(21) Appl. No.: 17/399,477

(22) Filed: Aug. 11, 2021

(65) Prior Publication Data

US 2022/0048492 A1 Feb. 17, 2022

Related U.S. Application Data

(60) Provisional application No. 63/064,628, filed on Aug. 12, 2020.

(51) Int. Cl.
*B60V 1/15* (2006.01)
(52) U.S. Cl.
CPC ..................... *B60V 1/15* (2013.01)
(58) Field of Classification Search
CPC ...................................................... B60V 1/15
See application file for complete search history.

(56) References Cited

U.S. PATENT DOCUMENTS

| 3,468,394 A | 9/1969 | Winter |
| 3,877,542 A | 4/1975 | Paoli |
| 4,534,434 A * | 8/1985 | Stocking ................. B60V 1/15 180/122 |
| 5,307,893 A | 5/1994 | Bender et al. |
| 2008/0149780 A1 | 6/2008 | Pendzich |

FOREIGN PATENT DOCUMENTS

GB 2094734 A * 9/1982 ............... B60V 1/04

OTHER PUBLICATIONS

International Search Report dated Nov. 25, 2021, for application No. PCT/US2021/045514, 14 pages.

* cited by examiner

*Primary Examiner* — Kevin Hurley
(74) *Attorney, Agent, or Firm* — BainwoodHuang

(57) ABSTRACT

Techniques involve an air flow assembly to provide pressurized air, e.g., for use by an air-cushion vehicle (ACV) or other craft. The air flow assembly includes a volute having a central chamber, a lift duct, and a thruster duct. The air flow assembly further includes a set of guide members disposed between the central chamber and the thruster duct, and linkage coupled to the set of guide members. The linkage is constructed and arranged to transition the set of guide members between a closed configuration in which the set of guide members closes an opening between the central chamber and the thruster duct, and an opened configuration in which the set of guide members opens the opening between the central chamber and the thruster duct.

20 Claims, 10 Drawing Sheets

UTILIZING AN AIR FLOW ASSEMBLY WITH INTERMITTENT THRUSTER CAPABILITIES

CROSS REFERENCE TO RELATED APPLICATIONS

This application is a regular utility application based on earlier-filed U.S. Application No. 63/064,628 filed on Aug. 12, 2020, entitled "UTILIZING AN AIR FLOW ASSEMBLY WITH INTERMITTENT THRUSTER CAPABILITIES", the contents and teachings of which are hereby incorporated by reference in their entirety.

BACKGROUND

Most conventional hovercraft includes a centrifugal fan and a volute. The impeller of the centrifugal fan rotates within the volute to generate pressurized air.

Many conventional hovercraft use a fan with a single discharge volute which provides pressurized air exclusively for the air cushion and vertical lift. Other conventional hovercraft use a fan with a double discharge volute which provides pressurized air for both the air cushion and horizontal thrust generation for craft control.

SUMMARY

Both of the above-described conventional hovercraft fan arrangements which use either a single discharge volute or a double discharge volute have deficiencies. For example, the single discharge volute hovercraft provides pressurized air for cushion air only. Accordingly, the addition of a separate mechanism for horizontal thrust and craft control greatly increases hovercraft weight, cost, and complexity.

Additionally, the double discharge volute fan arrangement provides pressurized air for both air cushion and horizontal control thrust and enhanced craft control. However, the shape of the double discharge volute purposefully directs (or steers) air flow into two separate air flow passageways, i.e., a first air flow passageway for cushion air and a second air flow passageway for craft control thrust. Such channeling of air flow in the direction of the second air flow passageway lessens air flow to the first air flow passageway. As a result, the shape of the volute is not optimized for cushion air only, even though there are often times when air flow through the second air flow passageway for horizontal craft control is not needed/not used (e.g., while at cruising speed) and thus operation of the double discharge volute is sub-optimal during these times.

In contrast to the above-described conventional hovercraft which use either a single discharge volute or a double discharge volute, improved air-cushion techniques are directed to utilizing an air flow assembly having intermittent thruster capabilities. In particular, the air flow assembly is equipped with a set of guide members that enables transitioning between a full fan mode in which air flow is provided only in one direction (e.g., for vehicle cushioning purposes) and a thruster mode in which air flow is split in multiple directions (e.g., for vehicle cushioning as well as for a horizontal thruster for low speed maneuverability). To this end, the air flow assembly may utilize a volute having a shape optimized to provide air flow in just the full fan mode direction and thus operate in the full fan mode more efficiently than a conventional double discharge volute. Furthermore, the set of guide members may control opening and closing of a secondary duct thus enabling sharing of the air flow in multiple directions during thruster mode (e.g., for simultaneous cushion and thruster). In accordance with some embodiments, during thruster mode, the set of guide members is able to split the air flow by impinging into a central chamber of the volute to peel (or bleed) off air flow for thruster use.

One embodiment is directed to an air flow assembly to provide pressurized air, e.g., for use by an air-cushion vehicle (ACV) or other craft. The air flow assembly includes a volute having a central chamber, a lift duct, and a thruster duct. The air flow assembly further includes a set of guide members disposed between the central chamber and the thruster duct, and linkage coupled to the set of guide members. The linkage is constructed and arranged to transition the set of guide members between a closed configuration in which the set of guide members closes an opening between the central chamber and the thruster duct, and an opened configuration in which the set of guide members opens the opening between the central chamber and the thruster duct.

Another embodiment is directed to an ACV which includes a vehicle frame, a fan supported by the vehicle frame, and an air flow assembly supported by the vehicle frame. The air flow assembly is constructed and arranged to control air flow provided by the fan. The air flow assembly includes:

(A) a volute having a central chamber, a cushion air lift duct, and a vehicle thruster duct,
(B) a set of guide members disposed between the central chamber and the vehicle thruster duct, and
(C) linkage coupled to the set of guide members, the linkage being constructed and arranged to transition the set of guide members between a closed configuration in which the set of guide members closes an opening between the central chamber and the vehicle thruster duct and an opened configuration in which the set of guide members opens the opening between the central chamber and the vehicle thruster duct.

In some arrangements, the central chamber of the volute is constructed and arranged to guide air flow from the fan to the cushion air lift duct. Additionally, the set of guide members, when in the closed configuration, blocks air flow between the central chamber and the vehicle thruster duct. Additionally, the set of guide members, when in the opened configuration, promotes air flow between the central chamber and the vehicle thruster duct.

In some arrangements, the volute includes a first curved periphery portion and a second curved periphery portion which define a spiral (or scroll). The set of guide members, when in the closed configuration, defines an arc that connects the first curved periphery portion and the second curved periphery portion to further define the spiral for laminar air flow from the central chamber into the cushion air lift duct. Accordingly, air flow strength may be maximized and air turbulence may be minimized.

In some arrangements, the set of guide members, when in the opened configuration, defines a louvered structure that impinges within the central chamber to deflect air flow from the central chamber into the vehicle thruster duct. Such impingement directs more air flow into the vehicle thruster duct compared to merely unblocking the opening (e.g., the louvered structure may actually divert air flow into the vehicle thruster duct).

In some arrangements, the fan is constructed and arranged to rotate about a central fan axis (e.g., the axis of impeller rotation). Additionally, each guide member of the set of guide members is constructed and arranged to pivot about a respective guide axis that is parallel to the central fan axis.

In some arrangements, the set of guide members includes a first guide member (e.g., a front vane or flap) constructed and arranged to pivot about a first guide axis, and a second guide member (e.g., a second vane or flap behind the front vane) constructed and arranged to pivot about a second guide axis which is parallel to the first guide axis. Additionally, the linkage is constructed and arranged to pivot the first guide member in a clockwise direction about the first guide axis while concurrently pivoting the second guide member in a counterclockwise direction about the second guide axis, the counterclockwise direction being opposite the clockwise direction.

In some arrangements, each guide member of the set of guide members has an arc-shaped cross section. Example arc-shaped cross sections include airfoil-shaped cross sections, scoops, curved blades, and the like.

In some arrangements, each guide member of the set of guide members has a front edge and a rear edge. Additionally, when the set of guide members is in the closed configuration, (i) the front edge of a second guide member of the set of guide members is covered by the rear edge of a first guide member of the set of guide members, (ii) the front edge of a third guide member of the set of guide members is covered by the rear edge of the second guide member of the set of guide members, (iii) the front edge of a fourth guide member of the set of guide members is covered by the rear edge of the third guide member of the set of guide members. Furthermore, the first, second, third, and fourth guide members are ordered in series.

In some arrangements, the front end of the first guide member is uncovered when the set of guide members is in the closed configuration. Such a feature enables a portion of the volute to taper towards the thruster duct for influencing air flow while the set of guide members is in the opened configuration. However, while the set of guide members is in the closed configuration, the front end of the first guide member covers the portion of the volute to taper towards the thruster duct to preserve a spiral shape of the volute for optimal air flow towards the lift duct.

In some arrangements, the ACV further includes a controller that moves the linkage from a first position in which the linkage holds the set of guide members in the closed configuration and a second position in which the linkage holds the set of guide members in the opened configuration.

In some arrangements, the vehicle thruster duct has a first end adjacent to the central chamber and a second end distal from the central chamber. Additionally, the first end of the vehicle thruster duct has a rectangular cross section. Furthermore, the second end of the vehicle thruster duct has a circular cross section. Such a geometry is well-suited for coupling with the central chamber (e.g., at the first end) and coupling with thruster-related ducting downstream (e.g., at the second end).

In some arrangements, the AVC further includes a nozzle coupled to the second end of the vehicle thruster duct to direct air flow from the vehicle thruster duct to provide horizontal thrust. The nozzle may be constructed and arranged to rotate 360 degrees about a vertical axis. Additionally, the nozzle may be constructed and arranged to deflect air flow from a vertical direction by at least 75 degrees (e.g., 80 degrees).

Yet another embodiment is directed to a method of operating an ACV. The method includes:
(A) activating a fan coupled to an air flow assembly of the ACV, the air flow assembly including:

(i) a volute having a central chamber, a cushion air lift duct, and a vehicle thruster duct,
(ii) a set of guide members disposed between the central chamber and the vehicle thruster duct, and
(iii) linkage coupled to the set of guide members, the linkage being constructed and arranged to transition the set of guide members between a closed configuration in which the set of guide members closes an opening between the central chamber and the vehicle thruster duct and an opened configuration in which the set of guide members opens the opening between the central chamber and the vehicle thruster duct;

(B) moving the linkage from a first position to a second position which holds the set of guide members in the closed configuration, the ACV obtaining cushion air flow from the fan through the cushion air lift duct while the linkage is in the second position; and (C) moving the linkage from the second position to the first position which holds the set of guide members in the opened configuration, the ACV obtaining cushion air flow from the fan through the cushion air lift duct (or feed duct) as well as horizontal thrust from the fan through the vehicle thruster duct while the linkage is in the first position.

Other embodiments are directed to systems and apparatus, circuitry, computer program products, and so on. Some embodiments are directed to various methods, electronic and/or mechanical components and the like which are involved in utilizing an air flow assembly with intermittent thruster capabilities.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to utilizing an air flow assembly having intermittent thruster capabilities. In particular, the air flow assembly is equipped with a set of guide members that enables transitioning between a full fan mode in which air flow is provided only in one direction (e.g., exclusively for vehicle cushioning purposes) and a thruster mode in which air flow is split in multiple directions (e.g., for vehicle cushioning as well as for a horizontal thruster for low speed maneuverability). To this end, the air flow assembly may be provisioned with a volute having a shape optimized to provide air flow in just the full fan mode direction only and thus operate more efficiently when providing air flow only for cushion air than a conventional double discharge volute. Furthermore, the set of guide members may control opening and closing of a secondary duct thus enabling sharing of the air flow in multiple directions (e.g., concurrently for cushion and thruster) while in thruster mode. In accordance with certain embodiments, the set of guide members is able to split the air flow by impinging into a central chamber of the volute to divert a stronger air flow for thruster use while in thruster mode.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Standard Volutes

Figure 1:
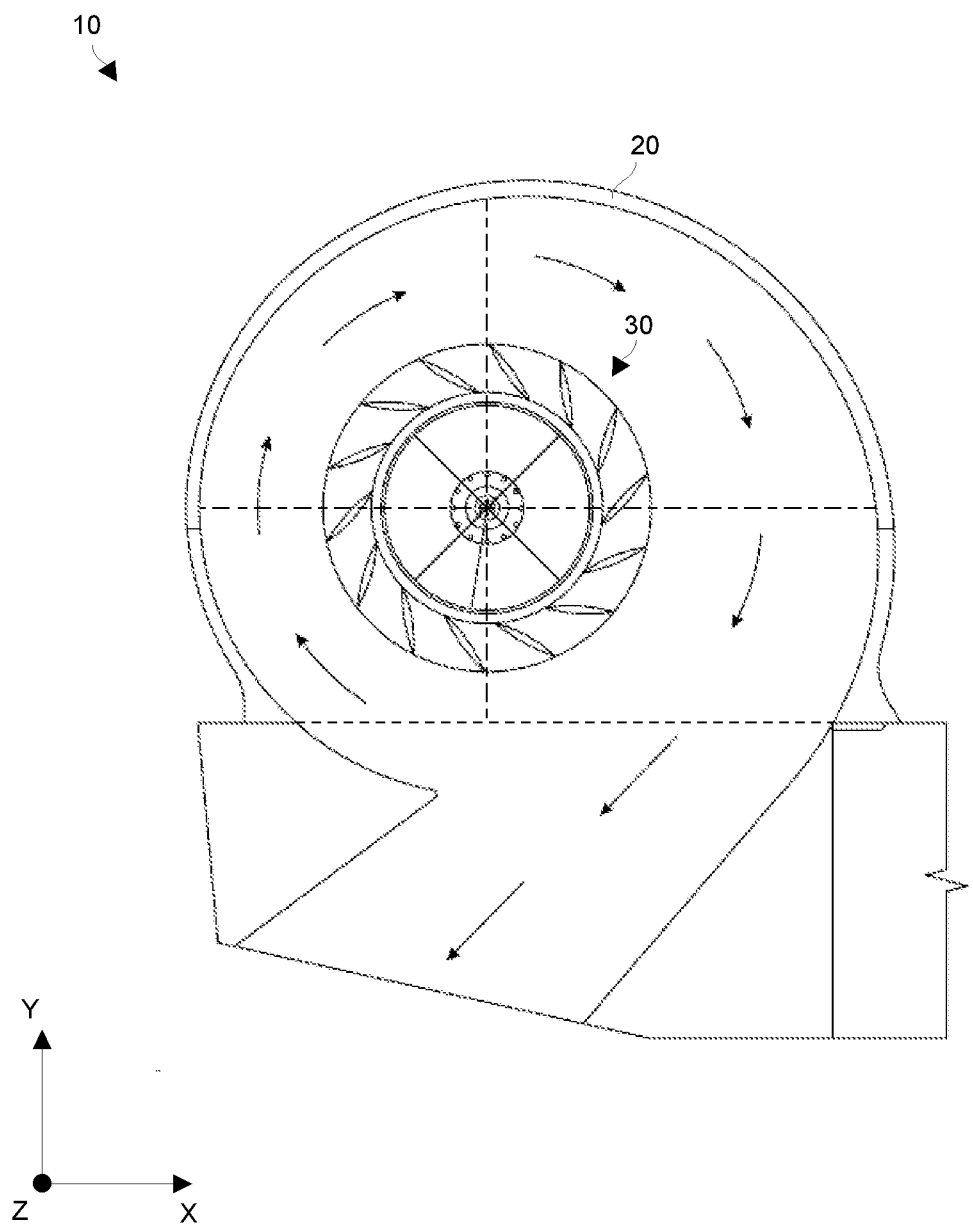
FIG. 1 is a cross sectional view of a single discharge volute.

FIG. 1 shows a cross sectional view of a single discharge volute 10 that provides pressurized cushion air flow for a conventional hovercraft. Such lift enables the hovercraft to hover over land and water with relatively low resistance.

The single discharge volute 10 provides pressurized air exclusively for air cushion i.e., lifting a hovercraft in the vertical direction (e.g., for illustration purposes, in the positive Y-direction in FIG. 1). Along these lines, a lift fan volute enclosure 20 extends around a lift fan 30 which generates the air flow within the lift fan volute enclosure 20 (identified by the arrows in FIG. 1).

It should be understood that the above-described single discharge volute does not have the ability to split the air flow for uses beyond cushion air. Accordingly, functions such as control over craft side force, yaw movement, etc. must be provided via other means such as by additional air propellers. Unfortunately, such other means may involve the addition of significant weight, costs, and/or complexity to the hovercraft.

Figure 2:
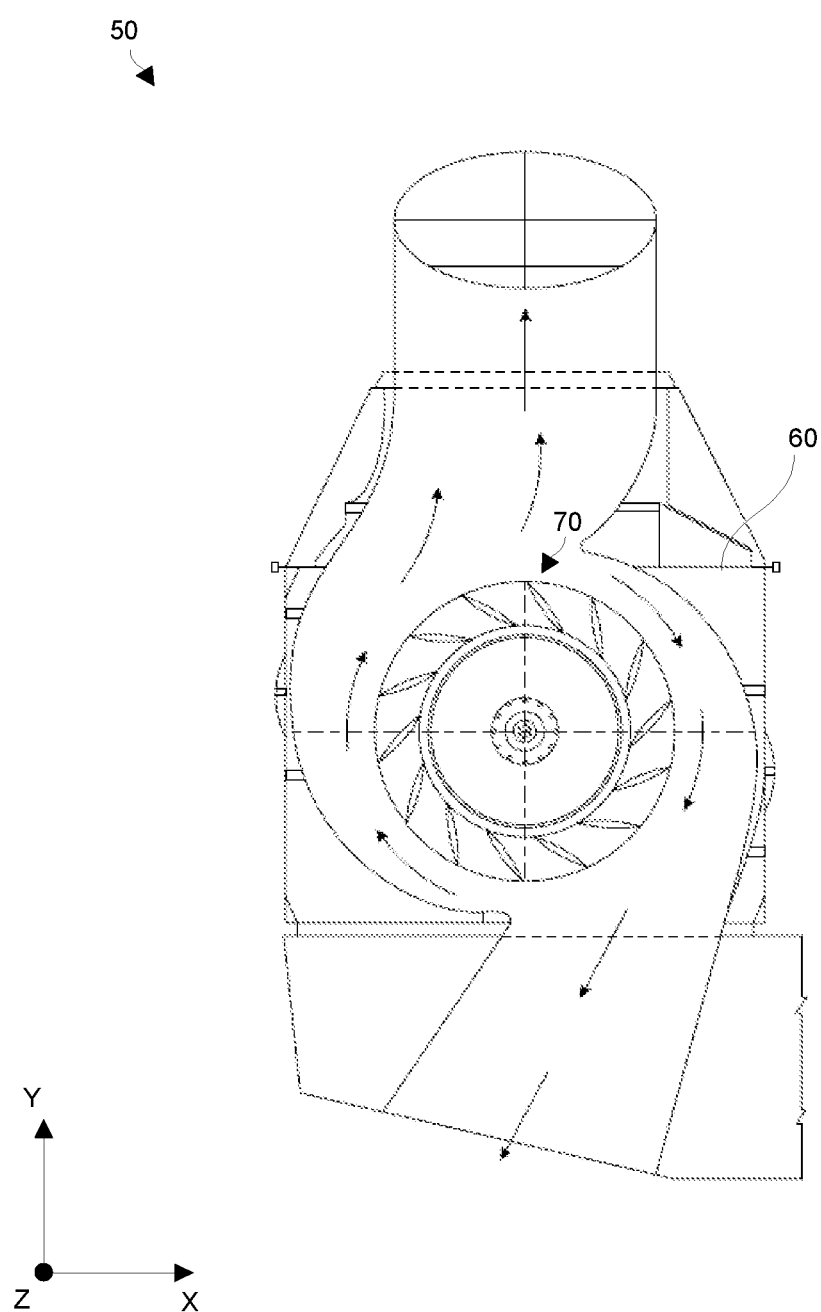
FIG. 2 is a cross sectional view of a double discharge volute.

FIG. 2 shows a cross sectional view of a double discharge volute 50 that provides pressurized air flow for air cushion as well as for craft control. In particular, a lift fan volute enclosure 60, which defines two passageways, extends around a lift fan 70 which generates the air flow (identified by the arrows in FIG. 2). That is, only half of the volute 50 (i.e., the right side) curves to a first passageway at the bottom for cushion air. The other half of the volute (i.e., the left side) curves to a second passageway at the top for use in horizontal craft control.

It should be understood that, due to the shape of the double discharge volute 50, the effectiveness of the double discharge volute 50 is significantly diminished when air flow for horizontal craft control is not needed. In particular, while the double discharge volute 50 supplies pressurized air flow through only the bottom passageway (e.g., when the top passageway is blocked by a downstream valve), the top portion of the double discharge volute 50 does not facilitate air flow to through the bottom passageway. Rather, due to the general symmetry for the air passageways, the top portion may generate undesired turbulence, drag, dampening, uneven air flow, etc. while not in use thus decreasing the efficiency of the double discharge volute 50.

Furthermore, while the double discharge volute 50 supplies pressurized air flow through both the bottom and top passageways, half of the air flow is provided for lift and half of the air flow is provided for horizontal craft control. Accordingly, the geometry of the double discharge volute 50 effectively doubles the air flow and power requirements when both the first and second passageways are open for air flow.

Improved Air Flow Assembly

Figure 3:
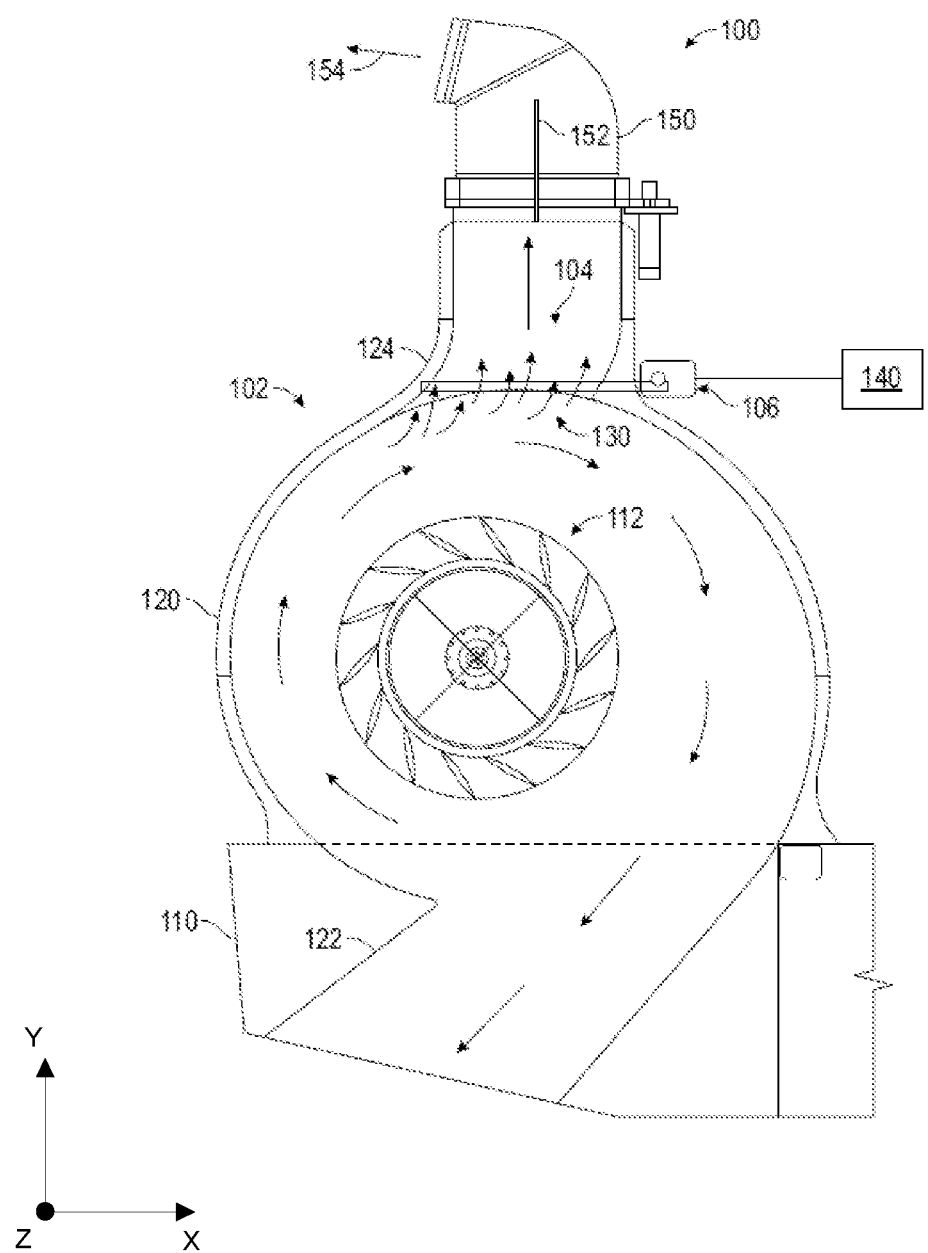
FIG. 3 is a cross sectional view showing certain details of an improved air flow assembly in accordance with certain embodiments.

FIG. 3 shows a cross sectional view of at least a portion of an improved air flow assembly 100 that is capable of providing pressurized air flow through multiple ducts in accordance with certain embodiments. As shown, the air flow assembly 100 includes a volute 102, a set of guide members 104, and linkage 106.

In accordance with certain embodiments, the air flow assembly 100 mounts to a frame 110 (e.g., a base or chassis). Such a frame 110 may belong to a larger structure and provide air flow for use by that structure. Along these lines, the larger structure may support and operate a fan 112 having an impeller that rotates within the volute 102 to generate air flow (e.g., about the Z-axis in FIG. 3).

Along these lines, the air flow assembly 100 may form part of an air cushion vehicle (ACV) and may provide air flow for both vehicle air cushion (e.g., generation of vertical lift in the positive Y-direction) and vehicle thruster (e.g., horizontal craft control). Further details of the air flow assembly 100 will now be provided in the context of an ACV although it should be understood that the air flow assembly 100 may be used in other situations such as operating an aerial vehicle, a vehicle in the water, a vehicle that rides on land, other equipment, and so on.

As shown in FIG. 3, the volute 102 includes a central chamber 120, a first duct 122 (e.g., a cushion feed duct), and a second or bleed duct 124 (e.g., a vehicle thruster duct). The set of guide members 104 is disposed between the central chamber 120 and the second duct 124 within an opening 130.

Each guide member 104 is constructed and arranged to pivot (or hinge) relative to the volute 102 such that the set of guide members 104 collectively blocks or unblocks the opening 130. Accordingly, each guide member 104 may be further referred to as a vane, a damper, a flap, a slat, a wing, a louver element, and so on.

In accordance with some embodiments, one or more of the guide members 104 has a non-flat (or non-rectangular) cross section such as a cross section in the shape of an airfoil to facilitate air flow thereby. In certain arrangements, all of the guide members 104 have non-rectangular cross sections. Suitable non-rectangular cross sections in accordance with these embodiments include curved shapes, teardrop shapes, concave shapes, scoop shapes, and so on.

In other embodiments, one or more of the guide members 104 has a substantially uniform thickness, e.g., as if cut from sheet stock. Nevertheless, such guide members 104 may be flat or non-flat (e.g., bent or rolled to have a curve) for enhanced air flow control.

It should be understood that the linkage 106 is constructed and arranged to operate the set of guide members 104. In particular, the linkage 106 is able to maneuver the set of guide members 104 between (i) a closed configuration in which the set of guide members 104 closes the opening 130 between the central chamber 120 and the second duct 124 and (ii) an opened configuration in which the set of guide members 104 opens the opening 130 between the central chamber 120 and the second duct 124. To this end, a portion of the linkage 106 couples to the set of guide members 104, and another portion is in a fixed position relative to the volute 102 (e.g., mounted to the volute 102, mounted to the frame 110, etc.).

Moreover, it should be understood that the linkage 106 may be able to maintain (e.g., hold) the set of guide members 104 at are various orientations to control the degree to which the opening 130 is blocked (or unblocked) by the set of guide members 104. One end of the range of operation is 100% blocked. However, the linkage may then 106 move the set of guide members 104 across a continuous range of movement to 90% blocked, 80% blocked, and so on until the set of guide members 104 is in a fully opened configuration.

In accordance with certain embodiments, the linkage 106 includes a set of connections and/or actuators which is operated (e.g., mechanically, electrically, electro-mechanically, etc.) by a controller 140. In particular, the controller 140 moves the linkage 106 from a first position in which the linkage 106 holds the set of guide members 104 in the closed configuration and a second position in which the linkage 106 holds the set of guide members 104 in the opened position.

In some embodiments, the controller 140 is capable of operating the linkage 106 in a manner that maintains the set of guide members 104 at fixed orientations partially between the opened and closed configurations. Such a feature enables the controller 140 to richly and robustly regulate the air flow through the second duct 124.

As further shown in FIG. 3, the air flow assembly 100 further includes a nozzle 150 coupled to second duct 124 to direct air flow from the second duct 124. In the context of an ACV, such air flow may provide horizontal thrust for craft control of the ACV.

In some embodiments, the nozzle 150 is constructed and arranged to rotate 360 degrees about a vertical axis 152 (e.g., the Y-axis in FIG. 3). In some embodiments, the nozzle 150 is constructed and arranged to deflect air flow from a vertical direction (e.g., the vertical axis 152) by at least 75 degrees (see the arrow 154 in FIG. 3).

It should be understood that, in contrast to a standard single discharge volute (e.g., see FIG. 1) and in accordance with certain embodiments, the air flow assembly 100 provides multiple separately ducted air flows. Accordingly, the air flow assembly 100 is capable of supplying one air flow for the air cushion and another air flow for a separate use such as horizontal craft control. In the ACV context, such a feature may alleviate the need for a separate horizontal craft control mechanism which therefore reduces weight, cost, complexity, and so on.

Additionally, in contrast to a standard double discharge volute (e.g., see FIG. 2) and in accordance with certain embodiments, the volute 102 of the air flow assembly 100 has a shape that optimizes air flow through a single duct 122 (e.g., a cushion air lift duct). In particular, when the set of guide members 104 is in the closed configuration, the spiral shape of the central chamber 120 remains intact (i.e., the set of guide members 104 defines an arc that connects a first curved periphery portion and a second curved periphery portion of the central chamber 120. Accordingly, the fan 122 is able to generate smooth air flow along the periphery with reduced velocity and pressure loss. As a result, the air flow assembly 100 is more efficient.

Moreover, when the set of guide members 104 is in the opened configuration (or in a partially opened configuration), the set of guide members 104 is able to peel off just enough air flow through another duct 124 (e.g., for thruster operation) without substantially cutting the power requirements for cushion air simply in half. Such operation enables the air flow through the duct 124 to be easily regulated without a significant drop in air flow through the first duct 122.

Figure 4:
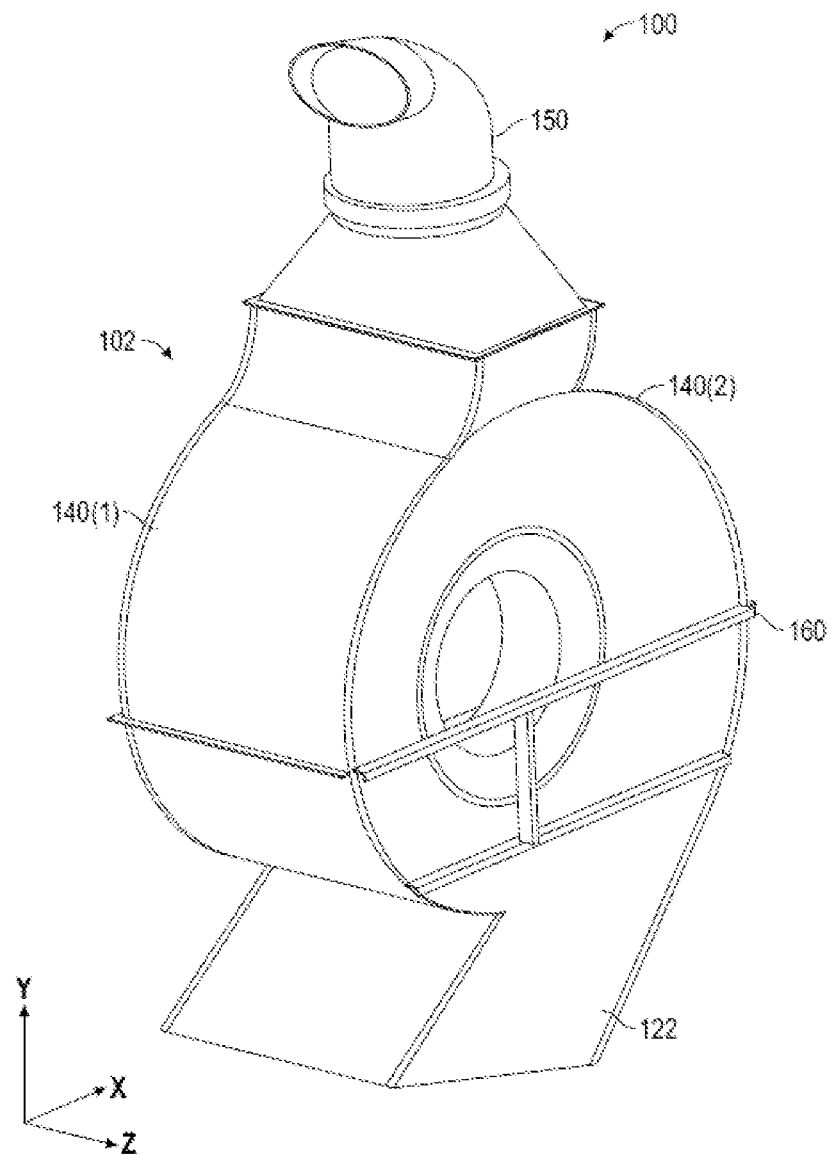
FIG. 4 is a perspective view showing certain details of the improved air flow assembly in accordance with certain embodiments.
Figure 5:
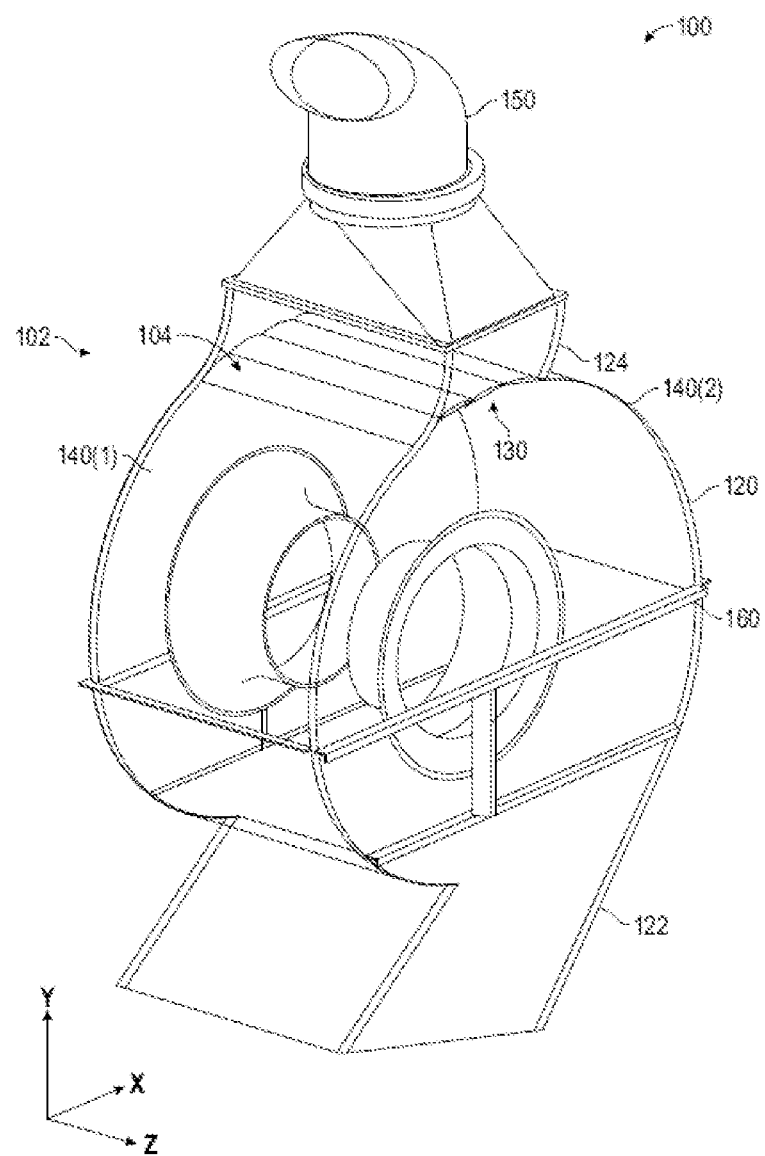
FIG. 5 is another view showing certain details of the improved air flow assembly in accordance with certain embodiments.
Figure 6:
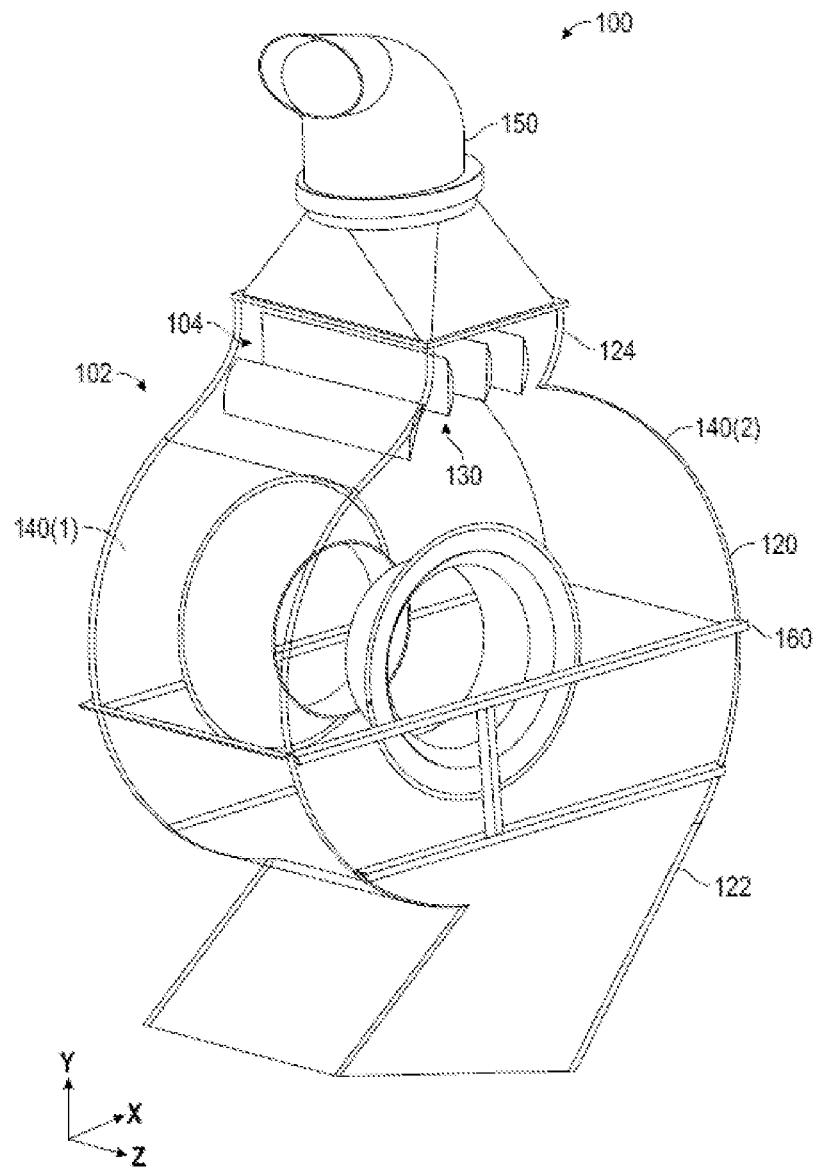
FIG. 6 is yet another view showing certain details of the improved air flow assembly in accordance with certain embodiments.

Further details will now be provided with reference to FIGS. 4 through 6. As mentioned earlier, the details of the air flow assembly 100 are discussed in the context of an ACV by way of example. FIG. 4 is a perspective view of at least a portion of the air flow assembly 100 in accordance with certain embodiments. FIG. 5 is a similar perspective view which enables the set of guide members 104 to be shown in the closed configuration (e.g., for full fan mode operation by an ACV) in accordance with certain embodiments. FIG. 6 is a similar perspective view which enables the set of guide members 104 to be shown in the opened configuration (e.g., for thruster mode operation by an ACV) in accordance with certain embodiments.

As shown in FIG. 4, the air flow assembly 100 is suitable for mounting or fastening to a support structure. Along these lines, the volute 102 or some other portion may attach to a fastening portion (or base section) 160 of the support structure in order to maintain the air flow assembly 100 in a fixed position relative to the support structure (e.g., the frame or chassis of a vehicle such as an ACV).

As shown in FIGS. 5 and 6, the set of guide members 104 are disposed within the volute 102 at the opening 130 between the central chamber 120 and a duct 124. The linkage 106 (FIG. 3) is omitted from FIGS. 5 and 6 to facilitate viewing of the of guide members 104.

To illustrate certain details and as shown in FIG. 5, the set of guide members 104 are in the closed configuration. In particular, the set of guide members 104 defines an arc that connects a first curved periphery portion 140(1) and a second curved periphery portion 140(2) of the central chamber 120. That is, the first curved periphery portion 140(1) and a second curved periphery portion 140(2) define a spiral (or curve), and the set of guide members 104 while in the closed configuration continues that spiral. As a result, the fan 122 (FIG. 3) is able to provide laminar air flow along the periphery with little or no disruption/turbulence.

To illustrate certain other details and as shown in FIG. 6, the set of guide members 104 are in the opened configuration. Such transitioning of the set of guide members between the closed configuration and the opened configuration is controlled by the controller 140 (FIG. 3).

As shown in FIG. 6, the set of guide members 104 impinges the flow of air within the central chamber 120. Accordingly, a portion of the air flow along the periphery of the central chamber 120 is peeled away and steered into the second duct 124.

As shown in FIGS. 4 through 6, the second duct 124 may have a geometry that funnels air flow from the central chamber 120 toward the nozzle 150. It should be understood that the length (and perhaps other geometrical aspects) of the second duct 124 may vary depending on the particular application and requirements for air flow use.

As further shown in FIGS. 4 through 6, the second duct 124 has a first end adjacent to the central chamber 120 and a second end distal from the central chamber 120. In accordance with certain embodiments, the first end of the second duct 124 has a rectangular cross section thus facilitating mating or smooth integration with the central chamber 120. Additionally, the second end of the second duct 124 has a circular (or round) cross section thus facilitating mating to the nozzle 150 and assisting with the rotational operation of the nozzle 150. Further details will now be provided with reference to FIGS. 7A and 7B.

Figure 7A:
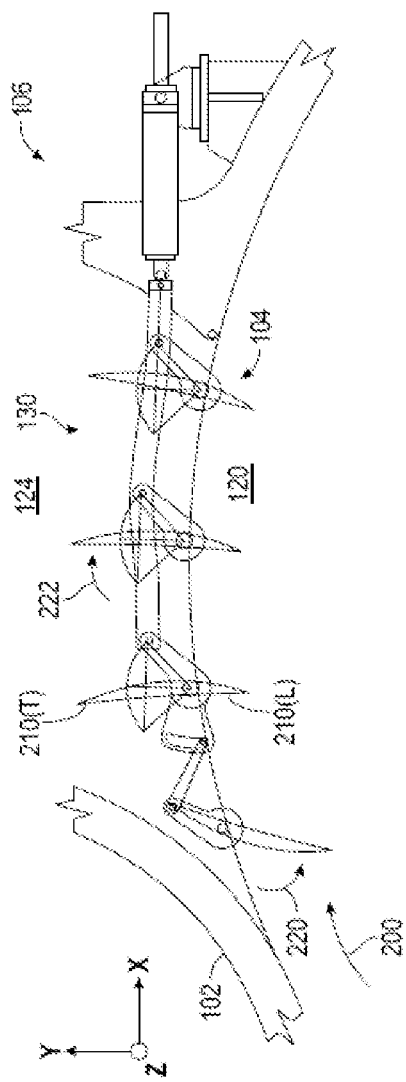
FIG. 7A is a cross sectional view of a portion of the improved air flow assembly in a first configuration in accordance with certain embodiments.
Figure 7B:
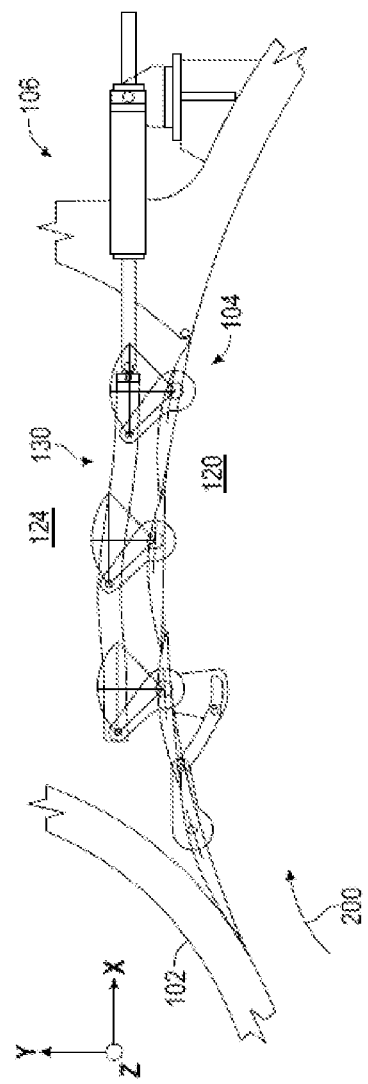
FIG. 7B is a cross sectional view of the portion of the improved air flow assembly in a second configuration in accordance with certain embodiments.

FIGS. 7A and 7B show certain details of the air flow assembly 100 in accordance with certain embodiments. FIG. 7A shows the set of guide members 104 disposed in the opened configuration in accordance with certain embodiments. FIG. 7B shows the set of guide members 104 disposed in the closed configuration in accordance with certain embodiments.

With reference to FIG. 7A, the linkage 106 (e.g., operated by a controller 140, also see FIG. 3) positions the set of guide members 104 in the opened configuration to allow air flow through the opening 130. As shown in FIG. 7A and in accordance with certain embodiments, each guide member 104 has an aerodynamic shape (e.g., an arc-shaped cross section) to facilitate air flow (e.g., see the arrow 200) from the central chamber 120 into the second duct 124. In particular, each guide member 104 has a leading (or front) edge 210(L) that faces (or moves into) the air flow 200 and a trailing (or rear/back) edge 210(T) that faces away from the air flow 200. Although flat surfaces and/or sharp corners are suitable for use for the guide members 104, an aerodynamic shape and/or rounded corners reduce undesired turbulence, etc. that would otherwise lower power, efficiency, and so on.

With reference to FIG. 7B, the linkage 106 positions the set of guide members 104 in the closed configuration to block air flow through the opening 130. As shown in FIG. 7B and in accordance with certain embodiments, the set of guide members 104 forms an arc that continues the curvature of the central chamber 120 to maintain efficient air flow that is directed out through the first duct 122 (e.g., see FIGS. 3 through 6). Accordingly, the set of guide members 104 minimizes turbulence thus improving power, efficiency, etc. of the air flow through the first duct 122.

It should be understood that the linkage 106 is able to transition the set of guide members 104 between the opened configuration (e.g., see FIG. 7A) and the closed configuration (e.g., see FIG. 7B). In particular, the linkage 106 rotates each guide member 104 about a respective guide axis that is parallel to the central fan axis, e.g., the Z-axis in FIGS. 7A and 7B (also see the Z-axis in FIG. 3). In accordance with certain embodiments, the linkage 104 is able to maintain the set of guide members 104 at different intermediate angles therebetween to enable air flow regulation.

Additionally, in accordance with certain embodiments, when transitioning the set of guide members from the closed configuration to the opened configuration, the linkage 104 rotates at least one guide member 104 in a direction that is opposite one or more other guide members 104. As best seen in FIG. 7A, the first (or leftmost) guide member 104 rotates in the counterclockwise direction about the Z-axis (see the arrow 220) when the set of guide members 104 from the closed configuration to the opened configuration. However, the other guide members 104 rotate in the clockwise direction about the Z-axis (see the arrow 222) when the set of guide members 104 from the closed configuration to the opened configuration.

Although the leading edge 210(L) of the first guide member 104 is uncovered when the set of guide members 104 is in the closed configuration, such a feature enables the leading edge 210(L) of the first guide member 104 to sit flush against the volute 102 while the set of guide members 104 are in the closed configuration for a tighter seal to inhibit air leakage through the opening 130 (e.g., see FIG. 7B). Additionally, such a feature further enables the trailing edge 210(T) of each guide member 104 to block the leading edge 210(L) of the following adjacent guide member 104 (or the edge of the volute 102 at the opening 130) to minimize turbulence while the set of guide members 104 is in the closed configuration (e.g., see FIG. 7B).

It should be understood that the set of guide members 104 of the air flow assembly 100 is illustrated in FIGS. 7A and 7B as having exactly four guide members 104 arranged in series by way of example. Such an arrangement serves as an effective louvered structure that prevents air flow into the second duct 124 when the set of guide members 104 is in the closed configuration, and impinges within the central chamber 120 to deflect air flow from the central chamber 120 into the second duct 124 when the set of guide members 104 is in the opened configuration. It should be understood that other arrangements and/or numbers of guide members 104 are suitable for use as well (e.g., one, two, three, five, six, and so on). Further detail will now be provided with reference to FIG. 8.

Figure 8:
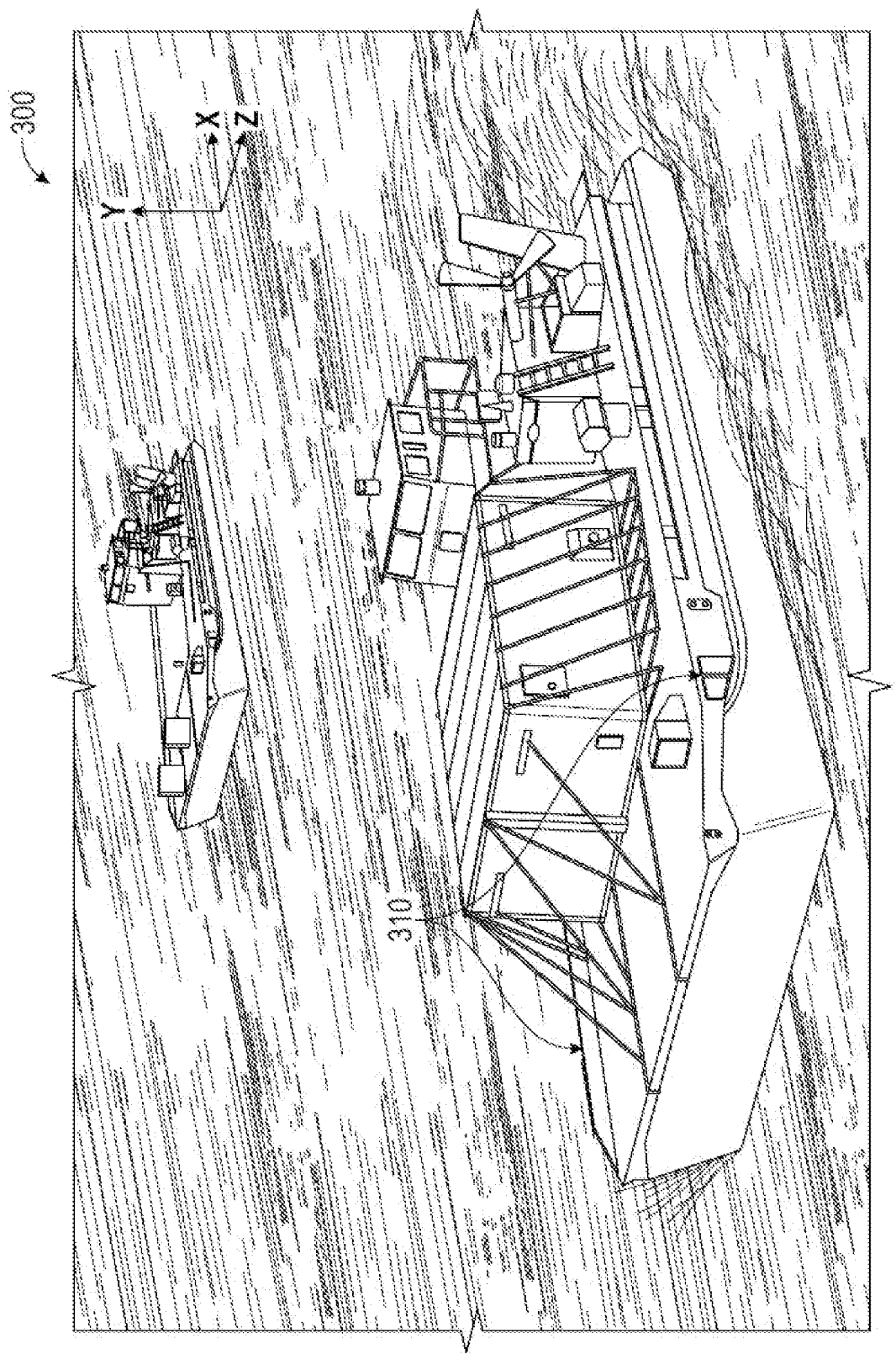
FIG. 8 is a perspective view of example craft in an operating environment in accordance with certain embodiments.

FIG. 8 shows, by way of example, a suitable use case environment for the air flow assembly 100. In particular, FIG. 8 shows multiple ACVs 300. Each ACV 300 includes a vehicle frame, one or more fans supported by the vehicle frame, and one or more air flow assemblies 100 supported by the vehicle frame.

As shown and by way of example only, the ACVs 300 may have form factors of relatively large military grade amphibious ships such as the LACV-30 (Lighter Air Cushion Vehicle, 30 tons). Other types and scales of ACVs include small single-seating hovercraft, racing or cruising style hovercraft, large passenger-carrying and/or vehicle-carrying class ships, and so on. Additionally, it should be understood that vehicles of other sizes and shapes are suitable for use as well. Moreover, other applications are suitable for use as well (e.g., hoverbarges, hovertrains, non-transportation applications, etc.).

In accordance with certain embodiments, there are multiple air flow assemblies 100 installed within each ACV 300. For example, in connection with the ACV 300 in the forefront, a front starboard side air flow assembly 100 provides air flow for cushion air (i.e., generating lift in the positive Y-direction) as well as for horizontal control (i.e., Z-axis control). Likewise, a front port side air flow assembly 100 provides air flow for cushion air (i.e., generating lift in the positive Y-direction) as well as for horizontal control (i.e., Z-axis control). In particular, as shown in FIG. 8, the forefront ACV 300 is equipped with ports 310 that utilize air flow from the air flow assemblies 100 for horizontal craft control. Further details will now be provided with referenced to FIG. 9.

Figure 9:
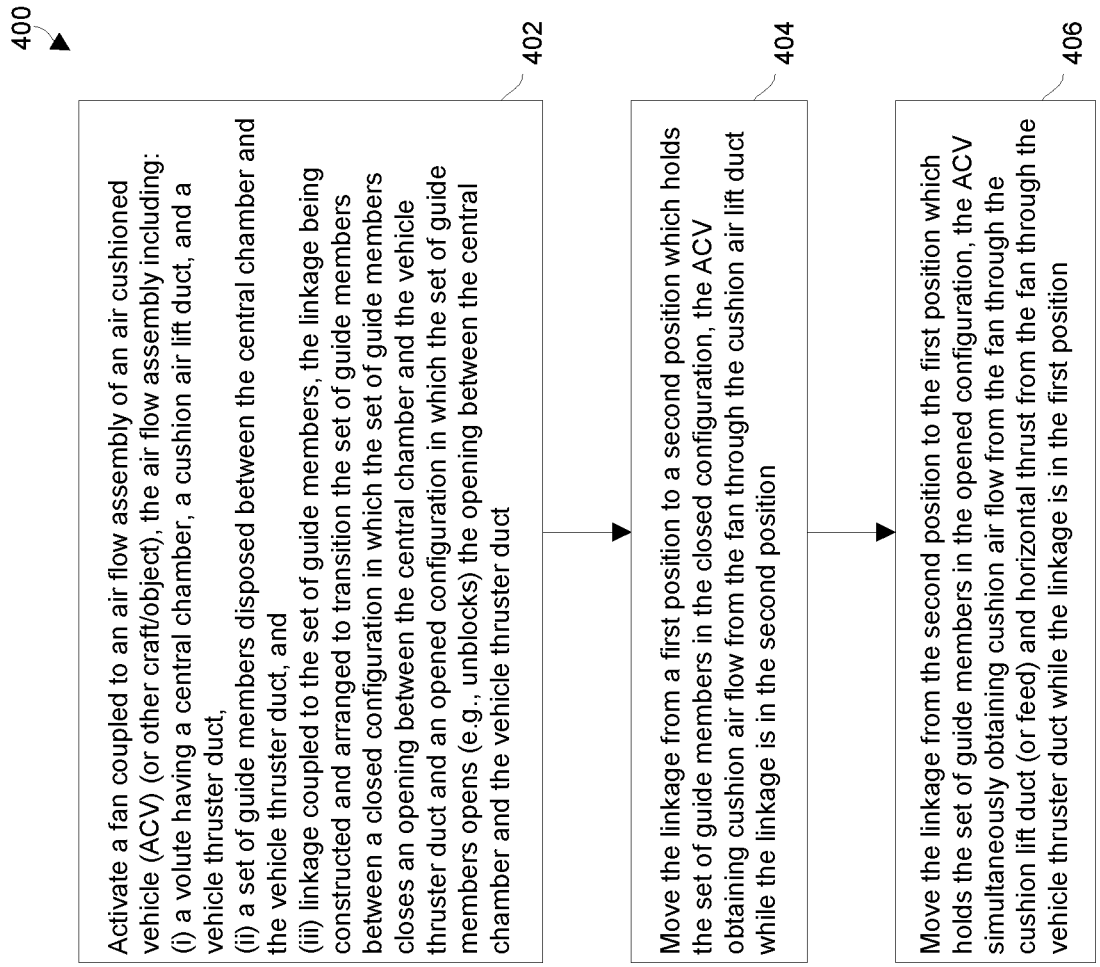
FIG. 9 is a flowchart of a procedure which is performed in accordance with certain embodiments.

FIG. 9 shows a procedure 400 for operating an ACV in accordance with certain embodiments. Such a procedure 400 may be effectuated by a controller 140, e.g., manual controls, computerized circuitry, combinations thereof, etc. (also see FIG. 3).

At 402, the controller activates a fan coupled to an air flow assembly of the ACV. Recall that the air flow assembly may include:
   (i) a volute having a central chamber, a cushion air lift duct, and a vehicle thruster duct,
   (ii) a set of guide members disposed between the central chamber and the vehicle thruster duct, and
   (iii) linkage coupled to the set of guide members, the linkage being constructed and arranged to transition the set of guide members between a closed configuration in which the set of guide members closes an opening between the central chamber and the vehicle thruster duct and an opened configuration in which the set of guide members opens the opening between the central chamber and the vehicle thruster duct.

At 404, the controller moves the linkage from a first position to a second position which holds the set of guide members in the closed configuration, the ACV obtaining cushion air flow from the fan through the cushion air lift duct while the linkage is in the second position.

At 406, the controller moves the linkage from the second position to the first position which holds the set of guide members in the opened configuration, the ACV obtaining cushion air flow from the fan through the cushion air lift duct and horizontal thrust from the fan through the vehicle thruster duct while the linkage is in the first position.

As indicated at 402, particular aspects of the procedure 400 (or the entire procedure 400) are suitable for other crafts and/or objects. Such structures benefit from efficiencies and capabilities provided by the air flow assembly 100.

As described above, improved air-cushion techniques are directed to utilizing an air flow assembly 100 having intermittent thruster capabilities. In particular, the air flow assembly 100 is equipped with a set of guide members 104 that enables transitioning between a full fan mode in which air flow is provided only in one direction (e.g., for vehicle cushioning purposes) and a thruster mode in which air flow is split in multiple directions (e.g., for vehicle cushioning as well as for a horizontal thruster for low speed maneuverability). To this end, the air flow assembly may utilize a volute 102 having a shape optimized to provide air flow in just the full fan mode direction and thus operate in the full fan mode more efficiently than a conventional double discharge volute. Furthermore, the set of guide members 104 may control opening and closing of a secondary duct 124 thus enabling sharing of the air flow in multiple directions during thruster mode (e.g., for simultaneous cushion and thruster). In accordance with some embodiments, during thruster mode, the set of guide members 104 is able to split the air flow by impinging into a central chamber 120 of the volute 102 to peel (or bleed) off air flow for thruster use.

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

It should be understood that some ACVs use lift fans to provide pressurized air flow to the skirt system and air cushion to achieve the on-cushion condition or hover. When on cushion such an ACV can move over land and water with relatively low resistance. Propulsion is typically provided by air propellers. Directional control is typically provided by rudders behind the propeller, or differential propeller thrust when more than one propeller is installed.

To enhance control, some conventional ACVs also use fans to provide pressurized air directed into nozzles creating a thruster, which can be rotated to provide craft side force and yaw moments. Some conventional ACVs use lift fans with double discharge volutes, simultaneously providing cushion air for lift and air to thrusters for control (about half the fan flow to thrusters, half to the cushion). This arrangement effectively doubles the lift fan air flow and lift power requirements. Thrusters do augment forward thrust; however, air thrusters are less than half as efficient as air propellers in thrust output for a given power input.

It should be further understood that, at cruise speeds, the rudders and differential thrust controls can effectively control the craft, maintaining track, and executing maneuvers such as turning or stopping the craft without the need for thrusters.

However, ACVs may be mainly operated at craft speed most of the time transiting between destinations at cruise condition and a fraction of its time in low speed maneuvering condition. Thus, installing continuous fan driven air thrusters, while enhancing control and specifically low speed control, are not necessary during cruise and increases the overall power required, with subsequent increases in required fuel, craft lightship weight, initial cost and lift cycle cost.

In contrast and in accordance with certain embodiments, an improved air flow assembly addresses the above issue by providing an ACV's lift and thrusters with two modes of operation:
1) Full Fan Mode—thruster vanes closed. With thruster vanes closed the full fan flow is directed into the cushion. With dedicated and efficient fans, full air flow is directed to the skirt and cushion reducing drag, and reducing total power required.
2) Thruster Mode—thruster vanes open. With the thruster vanes open, the lift flow is split between the cushion and the thruster. The thrusters significantly enhance craft control, with ability to apply side force, increase the amount of applied yaw moments. With reduced cushion flow skirt drag increases, however since thruster would be activated during low speed where some added drag is actual beneficial to control. With the fans typically located just forward midships on both sides of an ACV, these thrusters can provide side force, yaw moment or reverse. ACVs may be inherently low drag and susceptible to forces from winds, and minor surface slopes. The enhanced control forces of a craft with thrusters allows for more precise maneuvers and positioning.

In accordance with certain embodiments, an intermittent thruster may utilize a typical centrifugal fan with single discharge (e.g., see FIG. 1), with addition of thruster vanes and a transition duct with a directional nozzle. Such an implementation may utilize thruster vanes with linkages (e.g., see FIGS. 7A and 7B). The vanes may be curved asymmetrical air foils. The vanes may be arranged with their axis of rotation parallel to the lift fan impeller shaft. The vanes may be articulated through a series of linkages with an actuator.

In accordance with certain embodiments, with thruster vanes closed (e.g., see FIG. 7B), the vanes complete the volute scroll inner surface typical of a fan without a thruster. Thus, when closed, the fan performance approaches that of a single discharge, fully dedicated fan. When the thruster vanes are open (FIG. 7A), the volute resembles a double discharge volute, with a portion of the fan flow directed into the transition duct, then to the nozzle. The nozzle may turn the air about 80 degree from vertical towards the horizontal, creating primarily horizontal thrust opposite the direction of discharge. The nozzle may be rotated, generating thrust a full 360 degrees in the horizontal plane (e.g., see FIG. 3).

In accordance with certain embodiments, the air flow assembly uses thruster vanes shaped to conform the internal surface of the volute, so full single discharge fan performance is achieved when closed (FIGS. 5 and 7B). The same curved shape, when rotated along the vane span axis, creates turning vanes, persuading the fan air to flow into the discharge duct, reducing flow losses for improved efficiency. The transition duct located above the thruster vanes, encloses the pressurize thruster air and transitions for the rectangular lift fan opening at the thruster vanes, to the round thruster nozzle bearing surface. The nozzle turns the air from vertical about 80 degree towards the horizontal. The nozzle is then rotated on top of the transition duct for directional thrust.

It should be understood that the techniques disclosed herein are suitable for use on various vehicles. Such vehicles include those for general cargo, palletized cargo and wheel vehicle transport ACVs which would benefit from the intermittent thruster invention. Such vehicles may be used in unmanned applications when require enhanced control would partially benefit from the application of intermittent thrusters. Other ACVs that use fans could use the intermittent thruster concept to enhance low speed control.

What is claimed is:

1. An air-cushion vehicle (ACV), comprising:
   a vehicle frame;
   a fan supported by the vehicle frame; and
   an air flow assembly supported by the vehicle frame, the air flow assembly being constructed and arranged to control air flow provided by the fan, the air flow assembly including:
      a volute having a central chamber, a vehicle lift duct, and a vehicle thruster duct,
      a set of guide members disposed between the central chamber and the vehicle thruster duct, and
      linkage coupled to the set of guide members, the linkage being constructed and arranged to transition the set of guide members between a closed configuration in which the set of guide members closes an opening between the central chamber and the vehicle thruster duct and an opened configuration in which the set of guide members opens the opening between the central chamber and the vehicle thruster duct;
   wherein the volute includes a first curved periphery portion and a second curved periphery portion which define a spiral; and
   wherein the set of guide members, when in the closed configuration, defines an arc that connects the first curved periphery portion and the second curved periphery portion to further define the spiral for laminar air flow from the central chamber into the vehicle lift duct.

2. An ACV as in claim 1 wherein the central chamber of the volute is constructed and arranged to guide air flow from the fan to the vehicle lift duct;
   wherein the set of guide members, when in the closed configuration, blocks air flow between the central chamber and the vehicle thruster duct; and
   wherein the set of guide members, when in the opened configuration, promotes air flow between the central chamber and the vehicle thruster duct.

3. An ACV as in claim 2 wherein the set of guide members, when in the opened configuration, defines a louvered structure that impinges within the central chamber to deflect air flow from the central chamber into the vehicle thruster duct.

4. An ACV as in claim 3 wherein the fan is constructed and arranged to rotate about a central fan axis; and
   wherein each guide member of the set of guide members is constructed and arranged to pivot about a respective guide axis that is parallel to the central fan axis.

5. An ACV as in claim 3 wherein the set of guide members includes a first guide member constructed and arranged to pivot about a first guide axis, and a second guide member constructed and arranged to pivot about a second guide axis which is parallel to the first guide axis; and
   wherein the linkage is constructed and arranged to pivot the first guide member in a clockwise direction about the first guide axis while concurrently pivoting the second guide member in a counterclockwise direction about the second guide axis, the counterclockwise direction being opposite the clockwise direction.

6. An ACV as in claim 3 wherein each guide member of the set of guide members has an arc-shaped cross section.

7. An ACV as in claim 3 wherein each guide member of the set of guide members has a front edge and a rear edge;
   wherein, when the set of guide members is in the closed configuration, (i) the front edge of a second guide member of the set of guide members is covered by the rear edge of a first guide member of the set of guide members, (ii) the front edge of a third guide member of the set of guide members is covered by the rear edge of the second guide member of the set of guide members, (iii) the front edge of a fourth guide member of the set of guide members is covered by the rear edge of the third guide member of the set of guide members; and
   wherein the first, second, third, and fourth guide members are ordered in series.

8. An ACV as in claim 7 wherein the front end of the first guide member is uncovered when the set of guide members is in the closed configuration.

9. An ACV as in claim 3, further comprising:
   a controller that moves the linkage from a first position in which the linkage holds the set of guide members in the closed configuration and a second position in which the linkage holds the set of guide members in the opened configuration.

10. An ACV as in claim 3 wherein the vehicle thruster duct has a first end adjacent to the central chamber and a second end distal from the central chamber;
    wherein the first end of the vehicle thruster duct has a rectangular cross section; and
    wherein the second end of the vehicle thruster duct has a circular cross section.

11. An ACV as in claim 10, further comprising:
    a nozzle coupled to the second end of the vehicle thruster duct to direct air flow from the vehicle thruster duct to provide horizontal thrust.

12. An ACV as in claim 11 wherein the nozzle is constructed and arranged to rotate 360 degrees about a vertical axis.

13. An ACV as in claim 11 wherein the nozzle is constructed and arranged to deflect air flow from a vertical direction by at least 75 degrees.

14. An air flow assembly to provide pressurized air for use by an air-cushion vehicle (ACV), comprising:
- a volute having a central chamber, a vehicle lift duct, and a vehicle thruster duct,
- a set of guide members disposed between the central chamber and the vehicle thruster duct, and
- linkage coupled to the set of guide members, the linkage being constructed and arranged to transition the set of guide members between a closed configuration in which the set of guide members closes an opening between the central chamber and the vehicle thruster duct and an opened configuration in which the set of guide members opens the opening between the central chamber and the vehicle thruster duct;
- wherein the volute includes a first curved periphery portion and a second curved periphery portion which define a spiral; and
- wherein the set of guide members, when in the closed configuration, defines an arc that connects the first curved periphery portion and the second curved periphery portion to further define the spiral for laminar air flow from the central chamber into the vehicle lift duct.

15. An air flow assembly as in claim 14 wherein the central chamber of the volute is constructed and arranged to guide air flow from a fan to the vehicle lift duct;
- wherein the set of guide members, when in the closed configuration, blocks air flow between the central chamber and the vehicle thruster duct; and
- wherein the set of guide members, when in the opened configuration, promotes air flow between the central chamber and the vehicle thruster duct.

16. An air flow assembly as in claim 14 wherein the set of guide members, when in the opened configuration, defines a louvered structure that impinges within the central chamber to deflect air flow from the central chamber into the vehicle thruster duct.

17. An air flow assembly as in claim 14 wherein each guide member of the set of guide members has a front edge and a rear edge;
- wherein, when the set of guide members is in the closed configuration, (i) the front edge of a second guide member of the set of guide members is covered by the rear edge of a first guide member of the set of guide members, (ii) the front edge of a third guide member of the set of guide members is covered by the rear edge of the second guide member of the set of guide members, (iii) the front edge of a fourth guide member of the set of guide members is covered by the rear edge of the third guide member of the set of guide members; and
- wherein the first, second, third, and fourth guide members are ordered in series.

18. An air flow assembly as in claim 17 wherein the front end of the first guide member is uncovered when the set of guide members is in the closed configuration.

19. An air flow assembly as in claim 14 wherein the vehicle thruster duct has a first end adjacent to the central chamber and a second end distal from the central chamber;
- wherein the first end of the vehicle thruster duct has a rectangular cross section; and
- wherein the second end of the vehicle thruster duct has a circular cross section.

20. A method of operating an air-cushion vehicle (ACV), the method comprising:
- activating a fan coupled to an air flow assembly of the ACV, the air flow assembly including:
  - a volute having a central chamber, a vehicle lift duct, and a vehicle thruster duct,
  - a set of guide members disposed between the central chamber and the vehicle thruster duct, and
  - linkage coupled to the set of guide members, the linkage being constructed and arranged to transition the set of guide members between a closed configuration in which the set of guide members closes an opening between the central chamber and the vehicle thruster duct and an opened configuration in which the set of guide members opens the opening between the central chamber and the vehicle thruster duct,
  - wherein the volute includes a first curved periphery portion and a second curved periphery portion which define a spiral, and
  - wherein the set of guide members, when in the closed configuration, defines an arc that connects the first curved periphery portion and the second curved periphery portion to further define the spiral for laminar air flow from the central chamber into the vehicle lift duct;
- moving the linkage from a first position to a second position which holds the set of guide members in the closed configuration, the ACV obtaining vertical lift from air flow from the fan through the vehicle lift duct while the linkage is in the second position; and
- moving the linkage from the second position to the first position which holds the set of guide members in the opened configuration, the ACV obtaining vertical lift from air flow from the fan through the vehicle lift duct and horizontal thrust from the fan through the vehicle thruster duct while the linkage is in the first position.

\* \* \* \* \*